United States Patent Office 3,053,904
Patented Sept. 11, 1962

3,053,904
BISPHENOL PREPARATION
Albert L. Rocklin, Walnut Creek, Calif., assignor to Shell Oil Company, New York, N.Y., a corporation of Delaware
No Drawing. Filed May 25, 1960, Ser. No. 31,551
8 Claims. (Cl. 260—619)

This invention relates to useful bisphenols and to their preparation. More particularly, it relates to bis(hydroxyphenyl) methanes and to their preparation from novel di(hydroxyphenyl)poly(oxymethylene)ethers.

Bis(hydroxyphenyl)methanes, such as bis-(3,5-di-tert-butyl-4-hydroxyphenyl)methane, are well-known antioxidants for rubber, plastics and hydrocarbons such as lubricating oil. In general, these compounds have been conventionally prepared by the base-catalyzed condensation of phenols, such as 2,6-dialkylphenol, with formaldehyde in alcohol solution; see in this regard the patent to Filbey et al., U.S. 2,807,653, issued September 24, 1957.

It has now been found that such bis(hydroxyphenyl) methanes may readily be prepared by the base-catalyzed decomposition of certain high-molecular weight bis(hydroxyphenyl)polyethers. It is an object of this invention to provide a novel chemical process for preparing bis(hydroxyphenyl)methane. Another object is the provision of a new base-catalyzed process for preparing bis (hydroxyphenyl)methane. A further object is the provision of a novel process for preparing such bis(hydroxyphenyl) methanes by the base-catalyzed decomposition of bis(hydroxyphenyl)polyethers in secondary or tertiary alkanol. Other objects of the invention will be apparent from the following description of the process.

These objects are accomplished by the process for preparing bisphenols which comprises reacting bis(hydroxyphenyl)poly(oxymethylene) ether in a monohydric alkanol branched on the hydroxyl-substituted carbon atom in the presence of a catalytic amount of miscible base at a temperature above about 15° C.

The process of this invention can be used to prepare several types of bis(hydroxyphenyl)methanes, chiefly the bis(2-hydroxyphenyl) and the bis(4-hydroxyphenyl) methanes. Which of these types of products is prepared will be determined by the nature of the starting bis(hydroxyphenyl)poly(oxymethylene)ether. In general, the ether has the structure

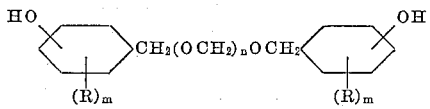

wherein each R is an alkyl radical, preferably having up to 8 carbon atoms, $m$ is an integer from 0 to 4, and $n$ is a positive integer, preferably having a value of from 1 to 8. These compounds, which are prepared by the condensation of formaldehyde and certain phenols, are white or light-colored crystalline solids. Their preparation is described in copending patent application Serial No. 854,556, filed November 23, 1959, the disclosure of which is specifically incorporated herein by reference. In general, the polyethers are obtained as a mixture of pure compounds taking the form of an amber glassy solid or oily liquid at room temperature. In such mixtures, the predominant ether is the bis(hydroxybenzyloxy)methane wherein $n$ is equal to one, while the average value of $n$ ranges from about two to about four.

Exemplary of such polyethers are those compounds having the noted structure wherein $n$ is one, such as bis(2-hydroxybenzyloxy) methane; bis(3-hydroxybenzyloxy)methane; bis(2-hydroxy-3-methylbenzyloxy)methane; bis(3-hydroxybenzyloxy)methane; bis(2-hydroxy-3-methylbenzyloxy)methane; bis(2,3,5,6-tetramethyl-4-hydroxybenzyloxy)methane; and bis(3,5-dipropyl-2-hydroxybenzyloxy)methane.

Preferred starting polyethers are those dialkyl compounds having the structure

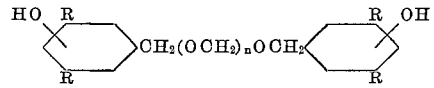

wherein each R is an alkyl radical having up to 8 carbon atoms, at least one of the alkyl radicals adjacent the hydroxyl group on each ring being branched on the alpha carbon atom, and $n$ has the significance noted above. The bisphenols prepared from these polyethers are the desirable bis(3,5-dialkyl-2-hydroxyphenyl) and bis(3,5-dialkyl-4-hydroxyphenyl)methanes having a hindered hydroxyl group on each phenyl ring. Such bisphenols have the most desirable antioxidant properties. Starting polyethers having the structure shown, in which $n$ is one, are typified by bis(3-methyl-5-isopropyl-4-hydroxybenzyloxy) methane; bis(2-hydroxy-3-tert-butyl-5-methylbenzyloxy) methane; bis(3,5-di-tert-hexyl-4-hydroxybenzyloxy)methane; bis(3,5-di-tert-amyl-2-hydroxybenzyloxy)methane; and bis(2-hydroxy-3-tert-octyl - 5 - isopropylbenzyloxy) methane. Most preferred of these polyethers, since the bisphenolic products have the best antioxidant properties, are those wherein each hydroxyl group is attached to a carbon atom of the phenyl ring para to that to which the ether bridge is connected, and in which each of the alkyl groups R on each phenyl ring is branched on the alpha carbon atom, e.g., bis(3,5-diisopropyl-4-hydroxybenzyloxy)methane; bis(3,5-di-tert-butyl-4-hydroxybenzyloxy) methane.

These polyethers are heated in certain alkanols in the presence of a catalytic amount of base to yield useful bisphenols. The solvent alkanol is a monohydric alkanol branched on the hydroxy-substituted carbon atom and preferably having from three to eight carbon atoms. By an alkanol branched on the hydroxylic carbon atom is meant a monohydric alkanol selected from the group consisting of secondary and tertiary alkanols generally wherein the hydroxylic carbon atom is connected to at least two alkyl substituents. Typical monohydric alkanols of this type are sec-butyl alcohol, 1-ethyl butanol, diethyl carbinol, 1-ethyl hexanol, and the like. Preferred alkanols affording the best yields of bisphenol are the tertiary alkanols such as tertiary amyl and butyl alcohol, 1,1-diethyl propanol, 1,1-dimethyl hexanol, and the like. Mixtures of such alkanols are also useful as solvents. Desirably, the alkanol or mixture of alkanols employed is that which is liquid at or below about 15° C. and which boils at a temperature above about 100° C.

Although amounts of water up to about 25% by weight of the solvent can be tolerated in the reaction medium, it is preferred that the conversion of the polyether to the bisphenol be performed under substantially anhydrous conditions. These conditions are easily achieved by using dry polyether and by predrying the branched alkanol solvent just prior to the reaction.

The amount of alkanol solvent required is, of course, that amount in which the starting polyether is soluble. In general, molar amounts of alkanol greater than about one mole per mole of polyether have been found useful, while molar amounts of from about 1 to about 20 moles on the same basis are convenient to employ.

Conversion of the polyether to the bisphenol in the branched alkanol is accomplished in the presence of a catalytic amount of a base. The base may be inorganic, such as an alkali metal or alkaline earth hydroxide, e.g., potassium hydroxide, sodium hydroxide, calcium hydroxide, barium hydroxide or the like. Alcoholates of such alkali metal or alkaline earth elements may also be employed as, for example, sodium methoxide, potassium ethoxide, calcium butoxide, or the like. Quaternary ammonium or pyridinium bases, e.g., tetramethyl ammonium hydroxide, or amines, particularly tertiary amines such as trimethylamine, may also be used. The amount of base required to catalyze the conversion will, of course, depend both on the nature of the reaction environment and on the temperature of the conversion but in general amounts of base from about 0.005 mole to about 0.50 mole per mole of polyether are sufficient, while amounts of base from about 0.01 mole to about 0.10 mole on the same basis are preferred. The preferred catalysts, because of their ready solubility in the reaction medium and the ease with which they are separated from the product bisphenol are the alkali metal hydroxides, particularly sodium and potassium hydroxide.

Conversion of the bis(hydroxyphenyl)poly(oxymethylene)ether to the bis(hydroxyphenyl)methane in the reaction medium described is accomplished at a convenient rate at a temperature at or above about 15° C. Below this temperature the reaction rate is conveniently low; even below room temperature it may take a week or two for significant conversion to the bisphenol to occur. Depending on the nature of the polyether and the alkanol solvent, and on the nature and concentration of the catalyst, the conversion may be performed at any temperature between about 15° C. and the boiling point of the reaction mixture. The preferred temperature range, in which the reaction rate is conveniently fast, is between about 50° C. and about 100° C. The reaction is readily conducted at atmospheric pressure, but if desired, subatmospheric or superatmospheric pressures may be employed. Autogenous pressure may also be employed. In order to insure the attainment of a pure white colorless product, the reaction is conveniently conducted under a blanket of some inert non-oxidizing gas, such as nitrogen, carbon dioxide, argon or helium.

The preparation of bisphenolic methanes by the process described has several important advantages. For example, the bisphenol products are obtained in very high yield and in high purity. Moreover, the reaction time is short, on the order of a few minutes at 75° C., and the catalyst and reaction solvent are inexpensive and readily available. Since the reaction is conducted at reasonably low temperature in basic medium, the product and starting material are not subject to dealkylation, as they would be in acid media. Furthermore, because of the comparatively low reactivity of the branched alkanol solvent, the formation of by-products by reaction of the reactant or product with the solvent is minimized.

The yield of bisphenolic methanes may be materially increased if the conversion of the bis(hydroxyphenyl)-polyether is conducted under the conditions described and in the presence of an added phenol. The added phenol may be any monohydroxy benzene or monohydroxyalkyl benzene, wherein at least one of the ring carbon atoms has a replaceable hydrogen atom thereon. Examples of such phenols are phenol, o-cresol, p-cresol, o-ethylphenol, the xylenols, p-tert-butylphenol, durenol, and the like. Most conveniently, the alkyl substituents should be those having up to 8 carbon atoms. In the preferred embodiment of the invention, wherein the reactant is a bis(3,5-dialkyl-4-hydroxyphenyl)poly(oxymethylene) ether, the phenol employed is a 2,6-dialkylphenol having the structure

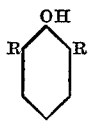

where R has the significance noted above. The amount of phenol employed will vary as the reaction conditions dictate, but most effective amounts of phenol are those from about 0.5 mole to about 5 moles per mole of the polyether used. When the mixture of the polyether and the phenol is heated to reaction temperature under the conditions described, they react to yield considerably greater amounts of the bisphenolic methane than are obtained from the conversion of the polyether alone.

While the reaction is readily conducted on a batch basis, it may also be conveniently accomplished in a semi-batch or continuous manner. Recovery of the product bisphenol from the reaction mixture is achieved by conventional methods, for example, crystallization, extraction, distillation and the like. Because the bisphenols are comparatively insoluble in the branched alkanols at relatively low temperatures, however, the bisphenols are most easily separated at the end of the reaction by cooling the reaction mixture to a temperature below about 50° C. At these low temperatures, the bisphenol products crystallize out and may be centrifuged or filtered from the reaction mixture. The mother liquor may then be recovered, purified, recycled or disposed of in any desired manner.

The products of the reaction are in general bisphenolic methanes which are light-colored or white crystalline substances at room temperature. When the preferred bis(3,5-dialkyl - 4 - hydroxyphenyl)poly(oxymethylene)ether reactant is employed, the product of the reaction is bis(3,5-dialkyl-4-hydroxyphenyl)methane. Such compounds, in their solid form, are readily finished, if desired, by washing, recrystallization or by other conventional means.

To illustrate further the novel process of the invention, the following specific examples are set forth. It should be understood, however, that these examples are merely illustrative and are not to be regarded as limitations to the appended claims, since the basic teachings therein may be varied at will as will be understood by one skilled in the art. In the examples, the proportions are expressed in parts by weight unless otherwise noted.

*Example I*

A mixture of bis(3,5-di-tert-butyl-4-hydroxyphenyl)-poly(oxymethylene)ethers having the general formula

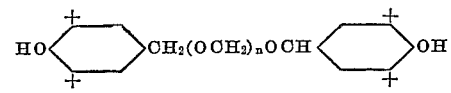

wherein the predominant amount of ether was bis(3,5-di-tert-butyl-4-hydroxybenzyloxy)methane, $n$ had a maximum value of 8, and the average value of $n$ was about 3, in an excess of anhydrous tert. butyl alcohol, and containing $\frac{1}{25}$ mole of potassium hydroxide, based on the polyether, was heated at 75° C. for five minutes.

At the end of that time, the reaction mixture was cooled to about room temperature. The product bis(3,5-di-tert-butyl-4-hydroxyphenyl)methane crystallized out and was filtered from the reaction mixture.

*Example II*

The mixture of polyethers of the previous example was heated at about 75° C. in anhydrous tert. butyl alcohol containing about $\frac{1}{25}$ mole of potassium hydroxide and about four moles of 2,6-di-tert-butylphenol.

At the end of five minutes the reaction was terminated by the addition of excess water, and the product bisphenol, bis(3,5-di-tert-butyl - 4 - hydroxyphenyl)methane, precipitated. The solid was filtered off, washed with water, and dried overnight at 100° C. In this way, a yield of 98.5% was obtained.

*Example III*

When a mixture of one mole of bis(3,5-diisopropyl-4-hydroxybenzyloxy)methane is heated at 70° C. for ten minutes in two moles of isophonanol containing ½ mole of sodium hydroxide, based on the polyether, a substantial conversion of the polyether is achieved.

The mixture is cooled to about 25° C. whereupon the bis(3,5-diisopropyl-4-hydroxyphenyl)methane precipitates out in good yield and may be filtered from the reaction mixture.

*Example IV*

A mixture of one mole of bis(3,5-di-tert-butyl-4-hydroxybenzyloxy)methane, two moles of 2,6-di-tert-butylphenol and 1/30 mole of potassium hydroxide, in substantially anhydrous tert. butyl alcohol is heated at 80° C. for five minutes. At the end of that time, infrared analysis shows no polyether or phenol in the reaction mixture.

The mixture is quenched by addition of 250 ml. of water and the precipitated product filtered off and washed. In this way, a virtually quantitative yield of bis(3,5-di-tert-butyl-4-hydroxyphenyl)methane is obtained.

*Example V*

A mixture of bis(3,5-di-tert-butyl-4-hydroxyphenyl) poly(oxymethylene)ethers of the type described in Example I were allowed to sit at room temperature (about 25° C.) for about 14 hours in an excess of tert-butyl alcohol containing about 1/30 mole of potassium hydroxide, based on the polyether.

At the end of that time a large crop of bis(3,5-di-tert-butyl-4-hydroxyphenyl)methane had precipitated and was filtered off. The product was thus obtained in high yield.

I claim as my invention:

1. The process for preparing bis(hydroxyphenyl)methane, each hydroxyphenyl group having up to four alkyl substituents and each alkyl substituent having up to 8 carbon atoms which comprises reacting bis(hydroxyphenyl)poly(oxymethylene)ether having up to 8 (oxymethylene) groups, and each hydroxyphenyl group having up to four alkyl substituents and each alkyl substituent having up to 8 carbon atoms in a monohydric alkanol branched on the hydroxy-substituted carbon atom in the presence of a catalytic amount of miscible base at a temperature above about 15° C.

2. The process for preparing bis(hydroxyphenyl)methane, each hydroxyphenyl group having up to 4 alkyl substituents and each alkyl substituent having up to 8 carbon atoms which comprises reacting the bis(hydroxyphenyl)polyether having the structure

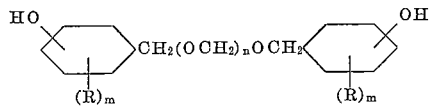

wherein each R is an alkyl radical having up to 8 carbon atoms, $m$ is an integer from 0 to 4, and $n$ is an integer from 1 to 8, in tertiary alkanol, in the presence of a catalytic amount of miscible base at a temperature above about 15° C.

3. The process of preparing bis(3,5-dialkyl-4-hydroxyphenyl)methane, which comprises reacting the bis(hydroxyphenyl)polyether having the structure

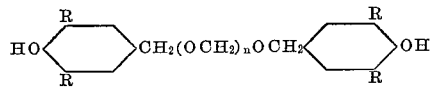

wherein each R is an alkyl radical having up to 8 carbon atoms and $n$ is an integer from 1 to 8, in tertiary alkanol, in the presence of a catalytic amount of an alkali metal hydroxide, at a temperature above about 15° C.

4. The process of preparing bis(3,5-dialkyl-4-hydroxyphenyl)methane which comprises heating the bis(hydroxyphenyl)polyether having the structure

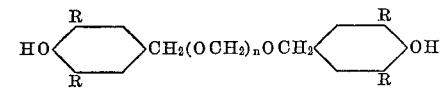

wherein each R is an alkyl radical having up to 8 carbon atoms and $n$ is an integer from 1 to 8, with 2,6-dialkylphenol in tertiary butyl alcohol, in the presence of a catalytic amount of alkali metal hydroxide, at a temperature above about 50° C.

5. The process of preparing bis(3,5-dialkyl-4-hydroxyphenyl)methane which comprises heating together the bis(hydroxyphenyl)polyether having the structure

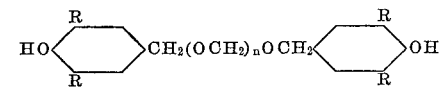

wherein each R is an alkyl radical having up to 8 carbon atoms and $n$ is an integer from 1 to 8, in tertiary alkanol, in the presence of a catalytic amount of alkali metal hydroxide, to a temperature above about 50° C., and then cooling the reaction mixture to below about 50° C. to separate the bis(3,5-dialkyl-4-hydroxyphenyl)methane.

6. The process for preparing bis(3,5-dialkyl-hydroxyphenyl)methane which comprises heating bis(3,5-dialkyl-hydroxybenzyloxy)methane in a monohydric alkanol branched on the carbon atom to which the hydroxyl group is attached, in the presence of a catalytic amount of miscible base, at a temperature above about 50° C.

7. The process for preparing bis(3,5-dialkyl-4-hydroxyphenyl)methane which comprises heating bis(3,5-dialkyl-4-hydroxybenzyloxy)methane in tertiary monohydric alkanol in the presence of a catalytic amount of alkali metal hydroxide, at a temperature above about 50° C.

8. The process for preparing bis(3,5-di-tert-butyl-4-hydroxyphenyl)methane which comprises heating bis(3,5-di-tert-butyl-4-hydroxybenzyloxy)methane in tertiary butyl alcohol in the presence of a catalytic amount of alkali metal hydroxide, at a temperature above about 50° C.

References Cited in the file of this patent

UNITED STATES PATENTS 2,841,622    Norton et al. -------------- July 1, 1958

OTHER REFERENCES

Van Duzee et al.: Jour. Amer. Chem. Soc., 57:147–51 (1935) (5 pages) (copy in Patent Office Lib.).